(12) United States Patent
Lange, III et al.

(10) Patent No.: US 11,390,256 B2
(45) Date of Patent: Jul. 19, 2022

(54) PORTABLE BRAKE CONTROLLER WITH WIRELESS CONTROL INTERFACE

(71) Applicant: Curt Manufacturing, LLC, Eau Claire, WI (US)

(72) Inventors: Robert Lange, III, White Lake, MI (US); Joecyl Sanchez, Walled Lake, MI (US); Harsh Desai, Taylor, MI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 154 days.

(21) Appl. No.: 16/163,235

(22) Filed: Oct. 17, 2018

(65) Prior Publication Data

US 2019/0111899 A1    Apr. 18, 2019

Related U.S. Application Data

(60) Provisional application No. 62/573,573, filed on Oct. 17, 2017.

(51) Int. Cl.
| | |
|---|---|
| *B60T 8/17* | (2006.01) |
| *B60Q 1/44* | (2006.01) |
| *H01R 13/66* | (2006.01) |
| *B60Q 1/00* | (2006.01) |
| *H01R 31/06* | (2006.01) |

(52) U.S. Cl.
CPC .............. *B60T 8/17* (2013.01); *B60Q 1/0094* (2013.01); *B60Q 1/44* (2013.01); *B60T 8/1708* (2013.01); *H01R 13/665* (2013.01); *H01R 31/065* (2013.01); *H01R 2201/26* (2013.01)

(58) Field of Classification Search
CPC .......... B60T 8/17; B60T 8/1708; B60T 13/66; B60T 7/20; B60Q 1/0094; B60Q 1/44
See application file for complete search history.

(56) References Cited

U.S. PATENT DOCUMENTS

| | | | |
|---|---|---|---|
| 4,006,453 A | 2/1977 | Bryant | |
| 4,072,381 A * | 2/1978 | Burkhart | .............. H01R 13/504 |
| | | | 439/144 |
| 4,889,212 A | 12/1989 | Temple | |
| 5,390,768 A | 2/1995 | Borkowski | |
| 5,415,424 A | 5/1995 | Dolan | |
| 5,551,539 A | 9/1996 | Frymiare | |

(Continued)

OTHER PUBLICATIONS

Elecbrakes Pty Limited, Introducing Australia's first Bluetooth Electric Brake Controller, downloaded from internet.

*Primary Examiner* — Faris S Almatrahi
*Assistant Examiner* — Andrew J Cromer
(74) *Attorney, Agent, or Firm* — Shewchuk IP Services, LLC; Jeffrey D. Shewchuk

(57) ABSTRACT

A brake controller is provided as an inline plug between the towing vehicle and the towed vehicle or trailer. The electronics including an accelerometer and wireless communication radio are potted within a brake controller housing package. There is no conventional display or input controls on the exterior of the brake controller package. Input settings, and possibly output messages, are communicated through a smartphone or similar software or hardware application. The brake controller can identify a hazard lighting condition and avoid braking the towed vehicle during the hazard lighting condition, and can also distinguish when braking during signaling a turn, using the turn signals of the towing vehicle.

15 Claims, 9 Drawing Sheets

(56) References Cited

U.S. PATENT DOCUMENTS

| | | | |
|---|---|---|---|
| 5,585,784 A | 12/1996 | Pabla et al. | |
| 6,012,780 A | 1/2000 | Duvernay | |
| 6,088,352 A | 5/2000 | Kulkarni et al. | |
| 6,325,466 B1 * | 12/2001 | Robertson | B60T 13/74 303/124 |
| 6,848,546 B2 | 2/2005 | Roll et al. | |
| 7,058,499 B2 | 6/2006 | Kissel | |
| 7,143,874 B2 | 12/2006 | Roll et al. | |
| 7,806,240 B2 | 10/2010 | Walstrom et al. | |
| 8,258,701 B2 | 9/2012 | Hoekstra | |
| 8,463,519 B2 | 6/2013 | McCann | |
| 9,150,201 B2 | 10/2015 | Smith et al. | |
| 9,315,173 B1 | 4/2016 | Gray et al. | |
| 9,440,627 B2 | 9/2016 | Kurtovic et al. | |
| 9,501,877 B2 | 11/2016 | Andrus | |
| 9,707,946 B2 | 7/2017 | Glidewell | |
| 9,738,125 B1 | 8/2017 | Brickley et al. | |
| 10,068,393 B2 | 9/2018 | Andrus | |
| 2003/0168908 A1 | 9/2003 | Robinson et al. | |
| 2006/0018098 A1 | 1/2006 | Hill et al. | |
| 2006/0214506 A1 | 9/2006 | Albright et al. | |
| 2008/0143179 A1 | 6/2008 | Rutherford | |
| 2009/0120747 A1 * | 5/2009 | Heise | B60T 8/1708 188/3 H |
| 2010/0152920 A1 | 6/2010 | McCann | |
| 2010/0152989 A1 | 6/2010 | Smith et al. | |
| 2016/0245659 A1 | 8/2016 | Ohba | |
| 2018/0079395 A1 | 3/2018 | Cekola et al. | |
| 2019/0359018 A1 * | 11/2019 | Brickley | B60W 50/14 |

\* cited by examiner

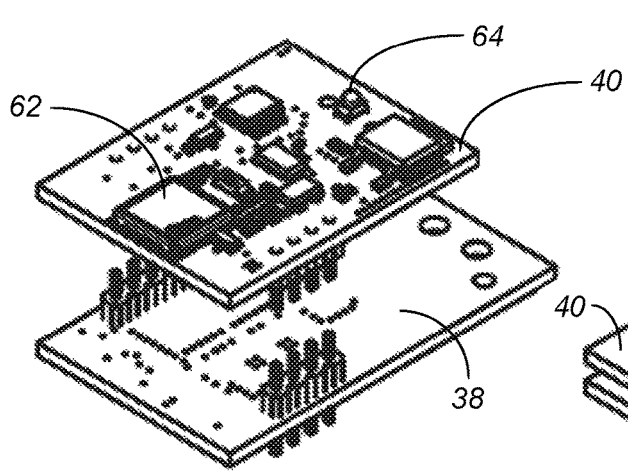
FIG. 10
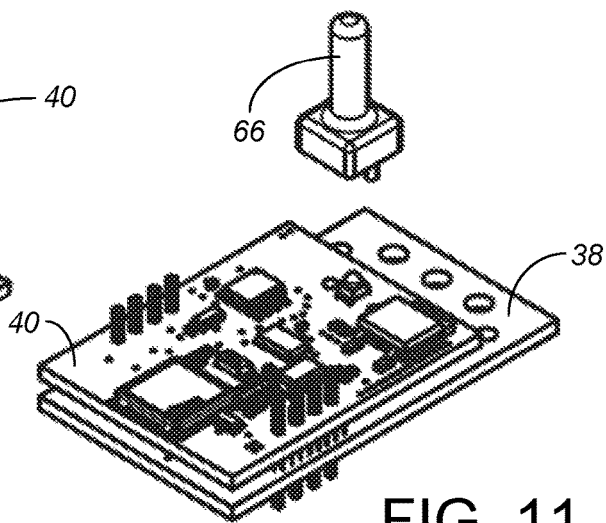
FIG. 11
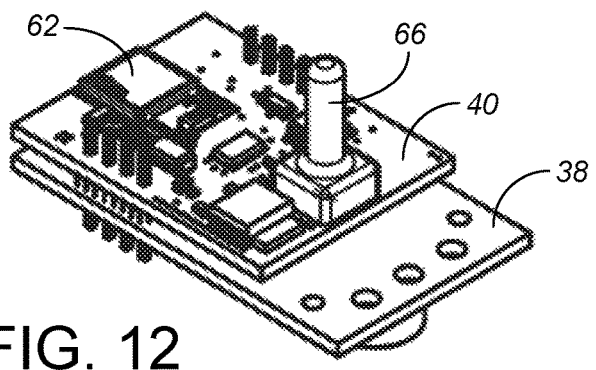
FIG. 12
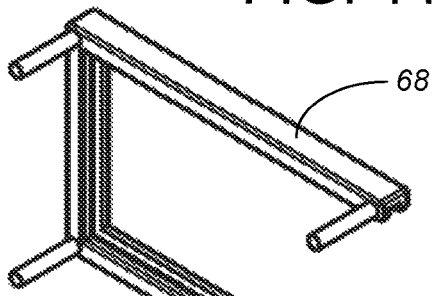
FIG. 13
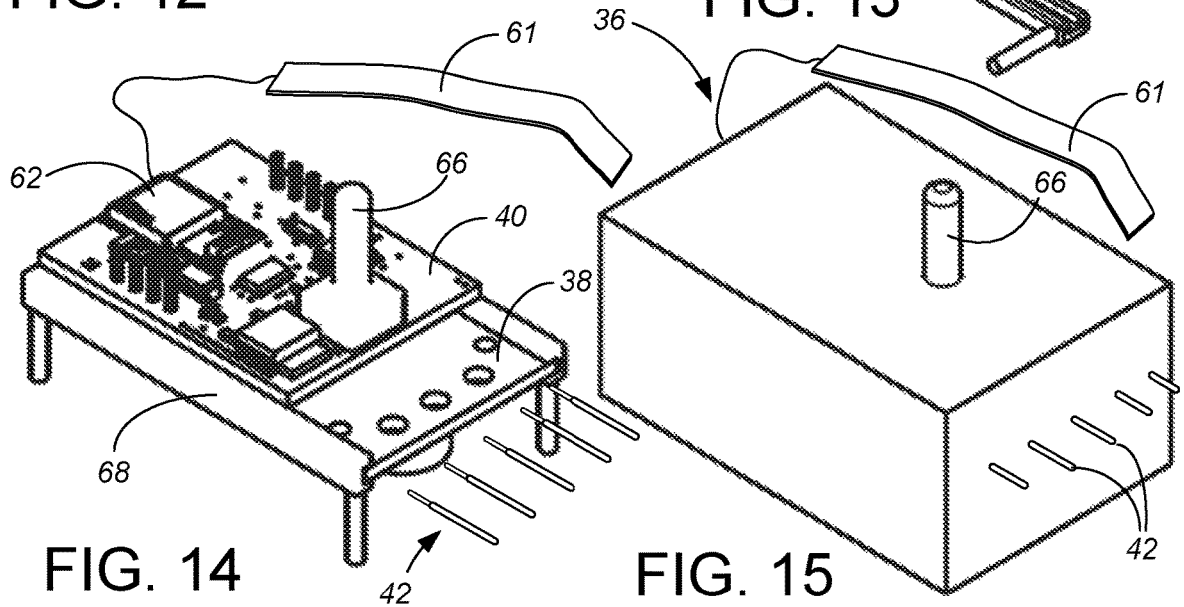
FIG. 14
FIG. 15

PORTABLE BRAKE CONTROLLER WITH WIRELESS CONTROL INTERFACE

CROSS-REFERENCE TO RELATED APPLICATION(S)

The present application claims the benefit of U.S. provisional patent application Ser. No. 62/573,573, filed Oct. 17, 2017, entitled "Portable Brake Controller With Wireless Control Interface". The contents of U.S. provisional patent application Ser. No. 62/573,573 are hereby incorporated by reference in entirety.

BACKGROUND OF THE INVENTION

The present invention relates to brake controllers used in towing, and particularly to the interface for communicating information to and from a microprocessor in the brake controller and to the location and layout of the brake controller on the vehicles.

Brake controllers are devices used in towing a trailer (or similar load) having brakes behind a towing vehicle. The brake controllers use various strategies and components to activate the trailer brakes at an appropriate rate and time relative to the driver's control of brakes on the towing vehicle. Exemplary brake controllers are disclosed in U.S. Pat. Nos. 6,012,780, 6,068,352, 7,058,499, 8,463,519, 9,150,201 and 9,315,173 and U.S. Pat. Pub. No. 2010/0152920, each incorporated by reference.

Some brake controllers include a display and all control buttons on a single package or housing that contains all of the integrated circuit control electronics. Other brake controllers, such as disclosed in U.S. Pat. No. 9,150,201, separate the display and/or control buttons on a housing which is different from the housing containing the integrated circuit control electronics. In both types of configurations as presently on the brake controller market, the display (to communicate from the unit to the person operating the vehicle) typically includes one or two seven-segment units, and perhaps a plurality of LEDs or other lights. At the same time, the control buttons (for the person operating the vehicle to input settings into the brake controller) can include one or more push buttons, slider controls, and one or more dials. With these various electronic components, the brake controller is typically mounted in a location that is protected from weather, such as in the cab of the vehicle, with controls reachable by the driver while driving. Such mounting typically involves a significant and costly installation procedure, and also commonly impinges on the visual sightlines and look/simplicity of the vehicle cab. Better interfaces with brake controllers are needed, supporting better and more robust brake controller packages.

SUMMARY OF THE INVENTION

The present invention is a brake controller without a conventional display and without input controls on the exterior of the brake controller package. In the preferred embodiments, the electronics are potted within a brake controller housing package which is resistant to weather. The housing is designed so the brake controller can be plugged directly in the electrical lines between the towing vehicle and the towed vehicle lights/brakes. Instead of having input controls and a display on the housing, the brake controller includes a wireless radio, and can have its input settings, and possibly its output messages, communicated through a smartphone or similar software or hardware application.

BRIEF DESCRIPTION OF THE DRAWINGS

The present invention is described with reference to the attached drawing sheets, in which:

FIGS. 10-15 are perspective views showing assembly steps for the preferred electronics module 36.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

There are different embodiments of the present invention to match the most common wiring connections between a towing vehicle and a trailer, such as a 7-way version and a 4-wire version. In commonly used 4 wire connections, the wires in the connection are typically: a) right turn/brakelight signal; b) left turn/brakelight signal; c) running light signal; and d) common or ground. Typical 7-way connectors add a power wire, a brake signal and a reverse signal. Other embodiments of the present invention match other wiring connections used between a towing vehicle and a trailer, including 4-flat, 4 way round, 5-flat, 6-way, 7-pin USCAR, SAE J3008 12 pin, and 13-way connectors. When embodied as an SAE J3008 12 pin connector, the brake controller uses the towing vehicle's left, right, brake and tail CANBUS signals instead of power signals.

Figure 1:
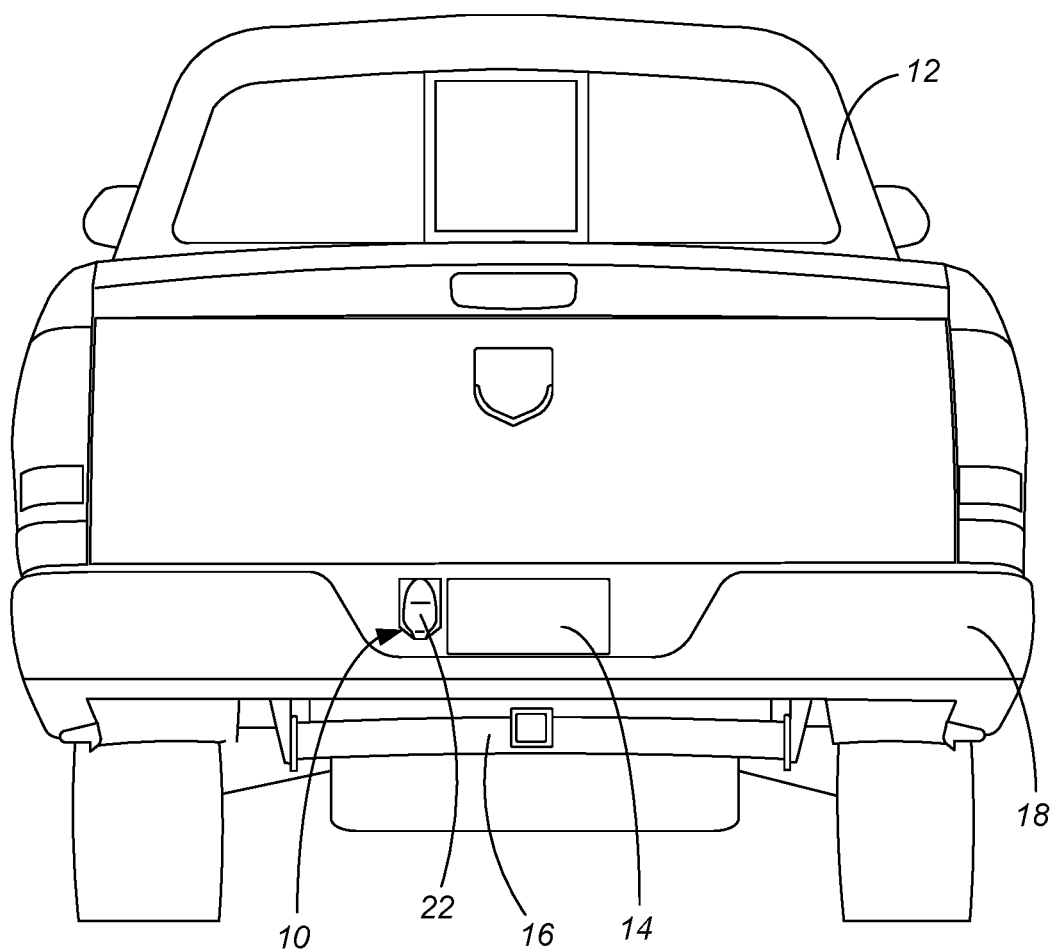
FIG. 1 is a photo showing a typical placement of a 7 way connector in accordance with the present invention in a towing vehicle.

Instead of having a brake controller housing which is mounted in the cab of the vehicle or handheld, the present invention involves a brake controller housing or package which is plugged into the wiring between the towing vehicle and the trailer. For instance, FIG. 1 shows a typical location of a 7-way connector and brake controller 10 of the present invention as mounted on a towing vehicle 12, to the side of the rear license plate 14. In the example depicted in FIG. 1, the towing vehicle 12 is a pickup truck. A hitch 16 is secured on the rear frame, depicted as a 2 inch by 2 inch receiver tube, just under the rear bumper 18 of the pickup truck 12. Other towing arrangements are equally applicable.

Figure 2:
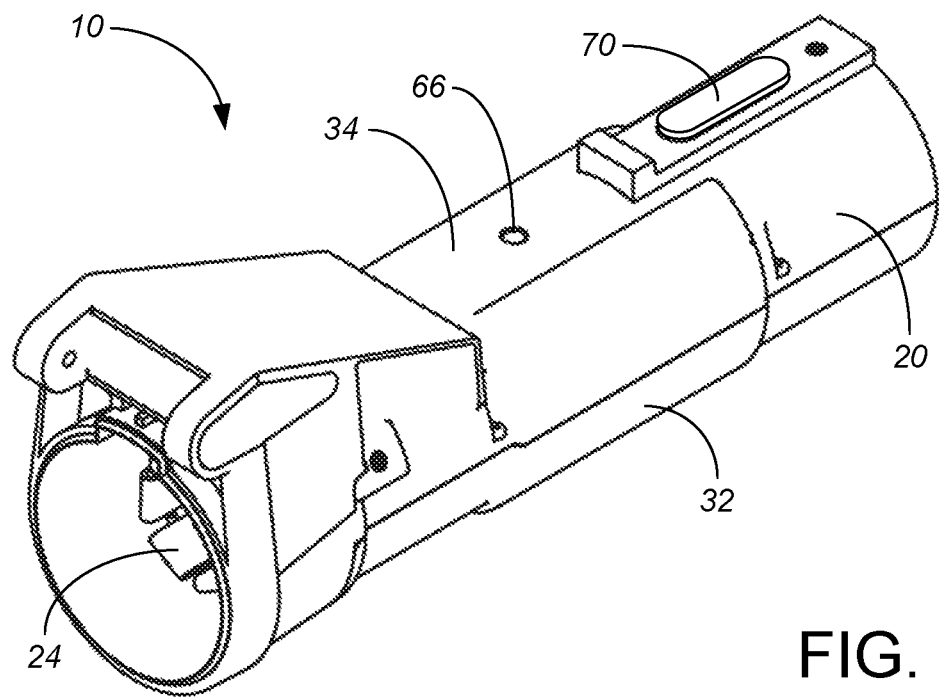
FIG. 2 is a perspective view of a preferred brake controller package in accordance with the present invention for use with a typical 7 way connector, with the protective cap over the socket removed.
Figure 3:
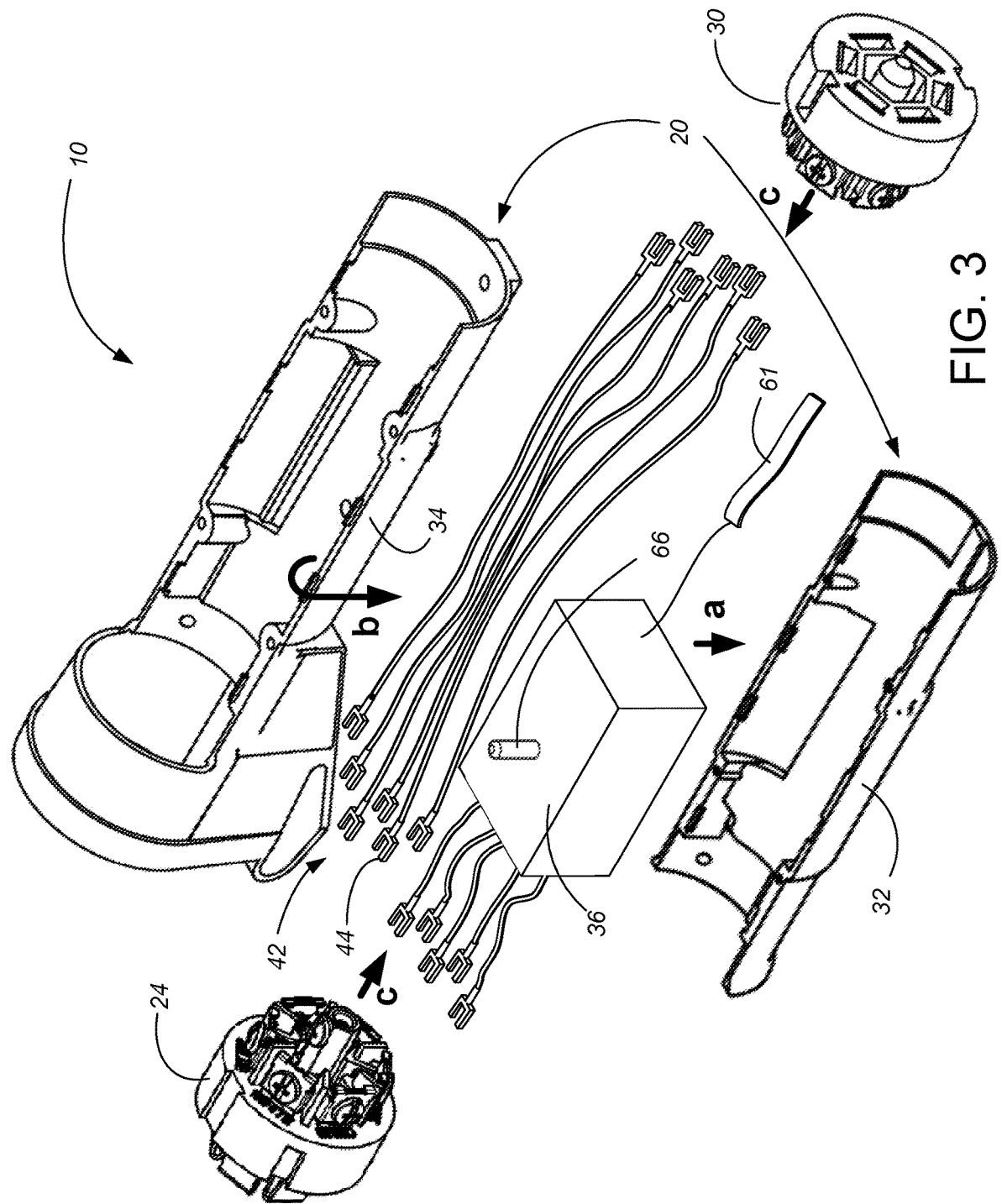
FIG. 3 is an exploded perspective view showing components used in manufacturing the brake controller of FIGS. 1 and 2.
Figure 4:
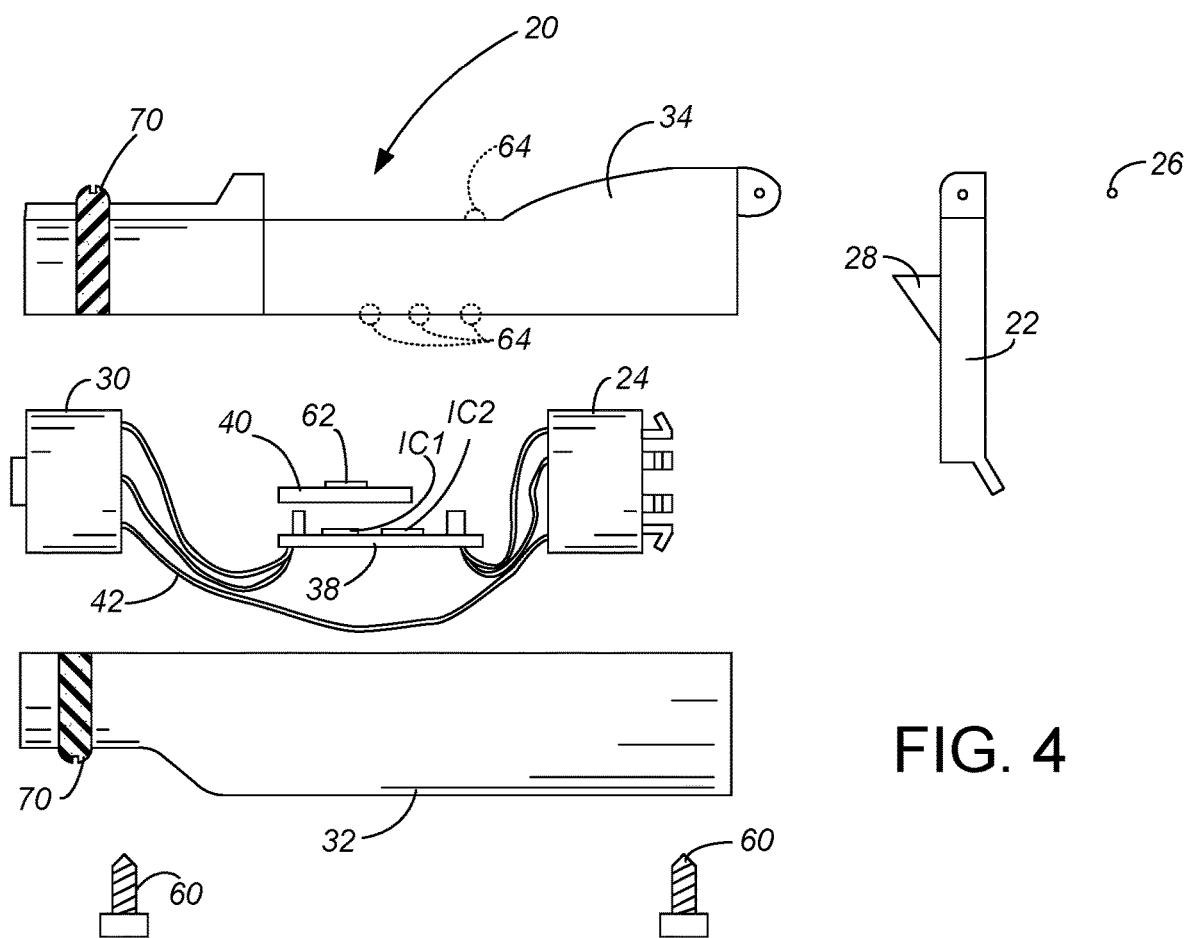
FIG. 4 is an exploded side view showing components of an alternative embodiment in a slightly different housing, with a different arrangement of electrical components and without potting.

In the preferred 7-way version of the present invention, the brake controller 10 includes female receptors and is plugged into the 7-way connector male plug on the towing vehicle 12, using a package such as shown in FIGS. 2-4. The package has an exterior housing 20, preferably with a hinged cover 22 (shown only in FIGS. 1 and 4) over the output plug 24. The door 22 protecting the male output plug 24 is connected such as with a hinge pin 26, and closable such as with a latch 28. One or more labels (not separately shown) or other markings may be added to the exterior housing 20 to indicate the desired orientation, direction and/or mounting locations of the brake controller 10.

The package then includes the same output configuration as on the towing vehicle 12, i.e., a 7-way connector male plug 24. The primary use is for 1-2 axle trailers (not shown) powered from a 7-way connection, including a 12 V DC power connection.

In this location, the brake controller 10 is subjected to exterior conditions and weather during towing. FIG. 3 shows the preferred components used to best withstand such exterior conditions. An input plug 30 enables the brake controller 10 to be readily plugged into a towing vehicle 12 using the output plug of the towing vehicle 12 as known in the art. An output plug 24, substantially identical to the output plug of the towing vehicle 12, enables the trailer wiring plug (not shown) to plug in to the brake controller 10. As can be seen, the brake controller housing 20 generally defines a direction that it runs between the towing vehicle 12 and the towed load, with the input plug 30 facing the opposite direction as the output 24, which is inherently understood by the user to suggest the plugging of the brake controller 10 between the towing vehicle 12 and the wiring for the trailer, i.e., with no wiring of the towing vehicle 12 being downstream of the brake controller 10, and no wiring of the trailer being upstream of the brake controller 10.

The housing 20 is preferably formed from two shell halves 32, 34 which mate together during assembly of the brake controller 10 to provide a rugged exterior for the product. While the housing 20 could be formed of metal such as steel or aluminum, for ease of manufacture, low cost and weather-proof sealing, the preferred housing shell halves 32, 34 are molded of plastic such as a fire retardant polycarbonate blend. In addition to receiving and supporting the input plug 30 and the output plug 24, the housing interior is shaped to securely hold the potted electronics module 36 of the preferred embodiment. Alternatively as shown in FIG. 4, the housing 20 may simply support electronic circuit boards 38, 40 in a waterproof interior. In addition to the electronics, wiring 42 is included in the housing 20. As shown in FIG. 3, the wiring 42 may include copper terminal forks 44 well known in the art, for simple attachment both to the input plug 30, the output plug 24, and the circuit board 38. Other methods and structures may alternatively used for the electrical connections.

Figure 5:
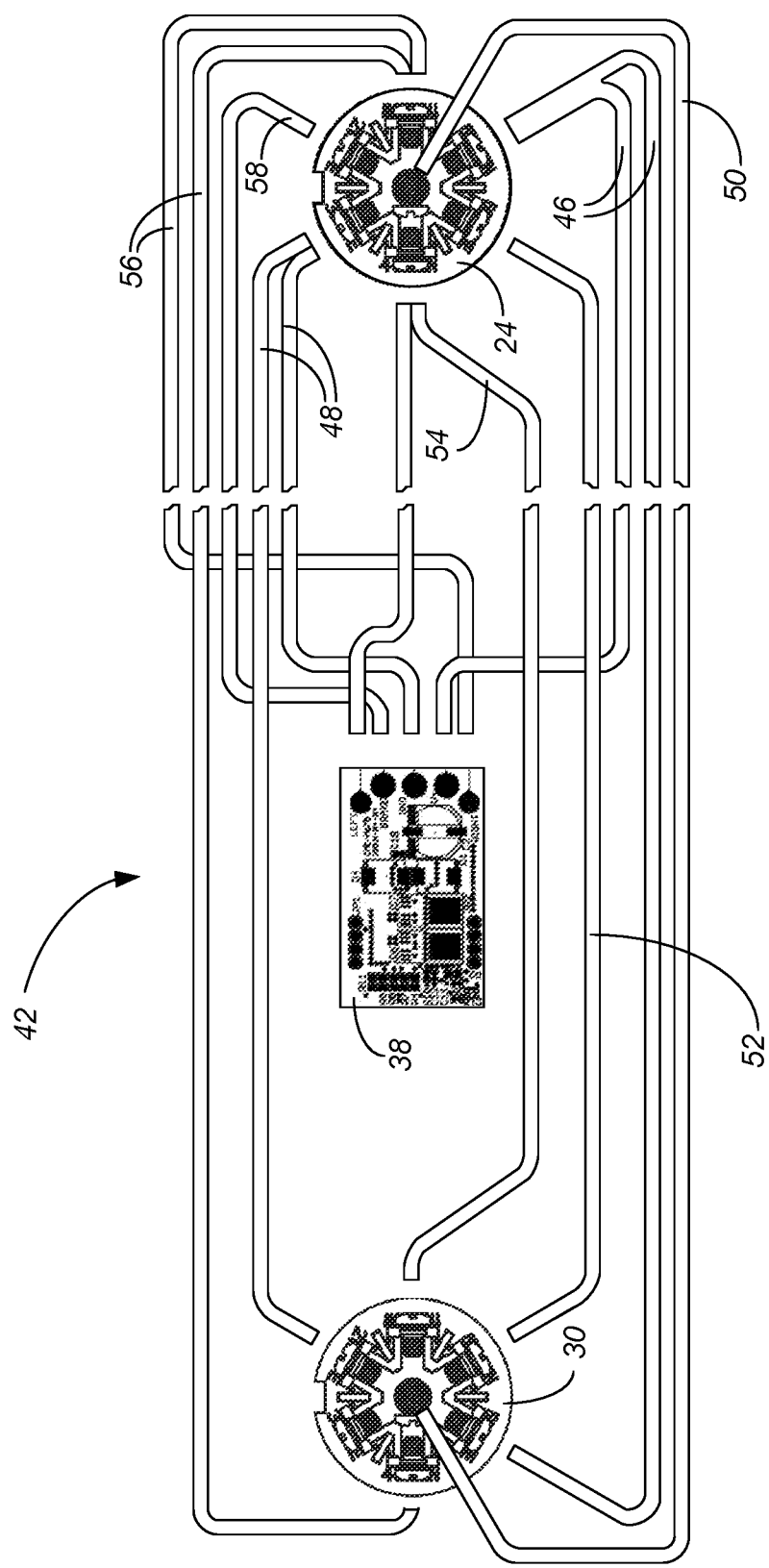
FIG. 5 is a schematic view of the wiring connections for the preferred embodiment of FIGS. 1-3.

The wiring 42 of the preferred embodiment is schematically shown in FIG. 5. As known in the art, two of the wires, both run through the housing 20 directly (from either output plug 24 as shown or from input plug 30) and run to the electronics module 36 are the hot 46 (preferably with its sheath colored black) and neutral or ground 48 (preferably with its sheath colored white) for connection to the towing vehicle's electrical system, which will typically be a 12V DC system. In the preferred embodiment, these power wires 46, 48 are 12 AWG. An auxiliary wire 50 (preferably 14 AWG yellow) which can be used as the reverse signal, and a running light wire 52 (preferably 16 AWG brown) run between the two plugs 24, 30 and bypass the electronics module 36. Left turn signal/brake wires 54 (preferably 16 AWG yellow) and right turn signal/brake wires 56 (preferably 16 AWG green) are run both to the electronics module 36 and through the housing 20 directly to the output plug 24. The brake signal wire 58 (preferably 12 AWG blue) is run solely from the electronics module 36. Of course, as these wires 42 remain internal to the housing 20, the coloring of these wires 42 is simply for ease of assembly and is not important to the consumer or operation of the brake controller 10.

Fasteners 60, adhesive, sonic welding or other convenient joining means can be used during assembly to join the housing shell halves 32, 34 around the electronics module 36, or 38 and 40, and the wires 42.

Figure 6:
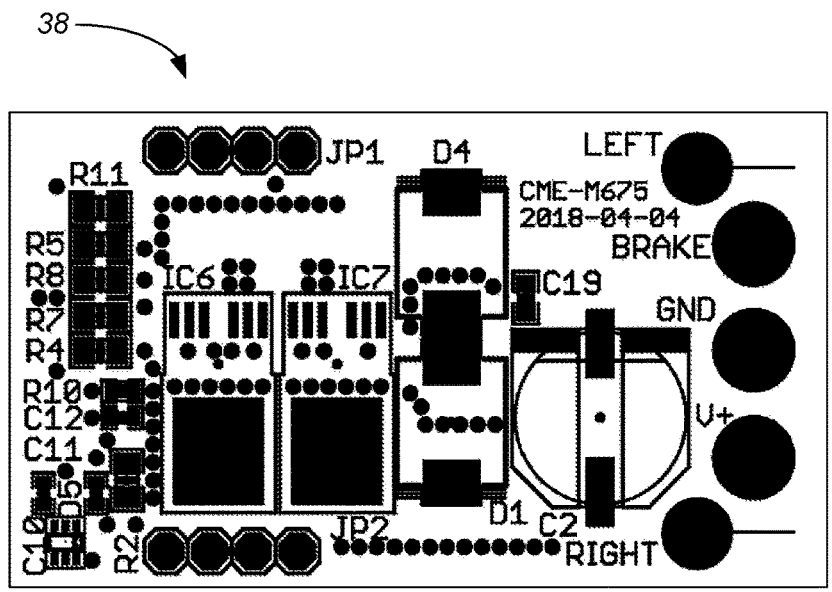
FIG. 6 is a top view of the power circuit board of the embodiment of FIGS. 1-3 and 5.
Figure 7:
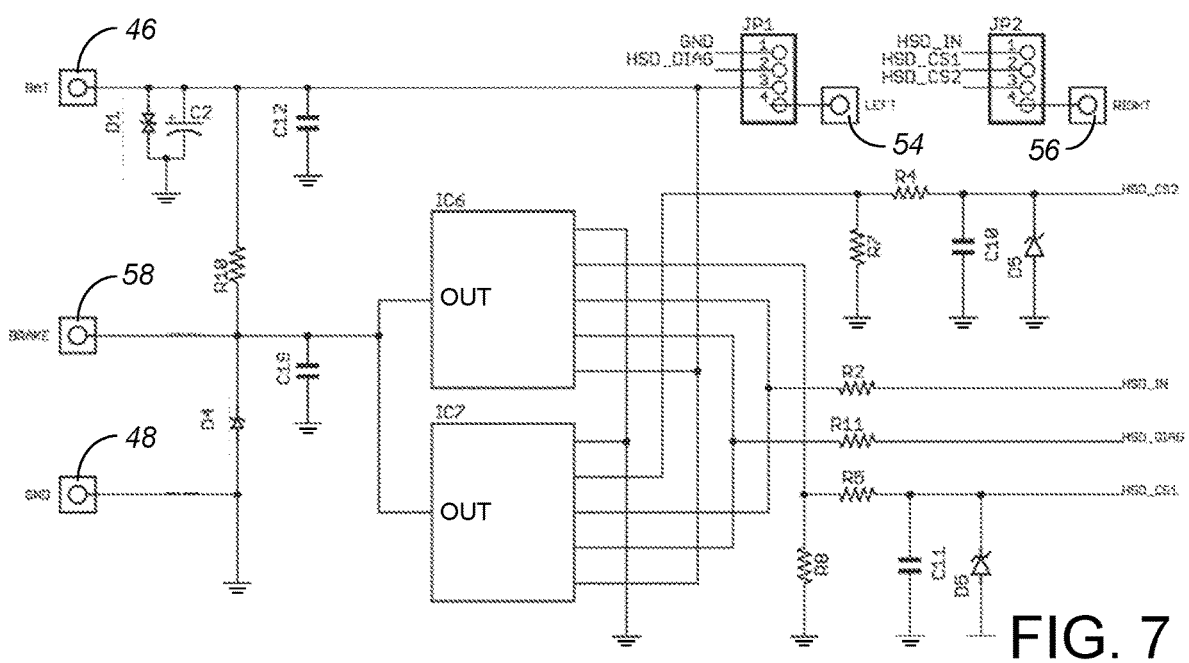
FIG. 7 is a schematic view of the power circuit board of FIG. 6.

FIGS. 6-9 detail the preferred circuit boards 38, 40 of the present invention in the potted electronics module 36. The primary components on the power circuit board 38 detailed in FIGS. 6 and 7 are two high side driver integrated circuits IC6 and IC7, such as model no. VN5E010AHTR-E commercially available from ST Microelectronics. The power circuit board 38 receives and conditions the battery 46, brake 58 and ground 48 signals using the capacitors C2, C10, C11, C12 and C19, the diodes D1, D4 and D5 and the resistors R2, R4, R5, R7, R8, R10 and R11 as shown in FIGS. 6 and 7. The two circuit boards 38, 40 are connected together by connectors JP1 and JP2, which directly run the left and right turn signals 54, 56 to the integrated circuit (IC) circuit board 40 of FIGS. 8 and 9. The high side driver outputs of IC6 and IC7 are run to the IC circuit board 40, as is the ground.

Figure 8:
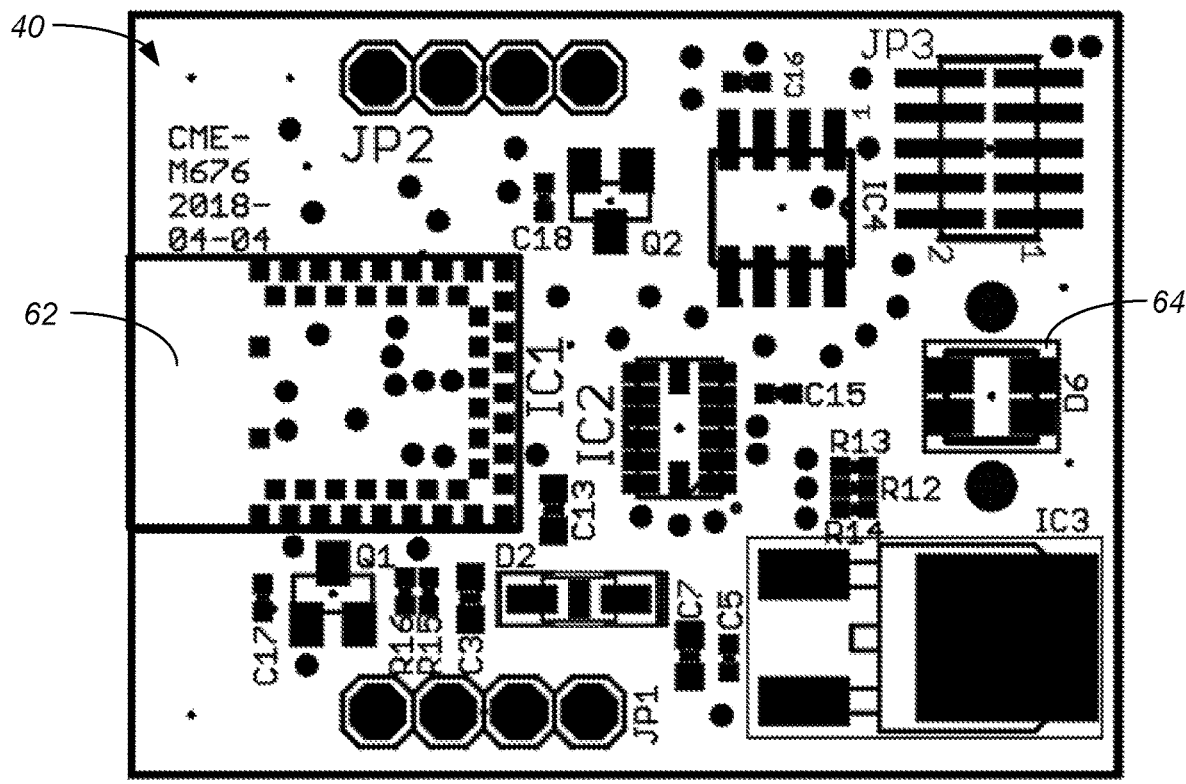
FIG. 8 is a top view of the integrated circuit board of the embodiment of FIGS. 1-3 and 5.
Figure 9:
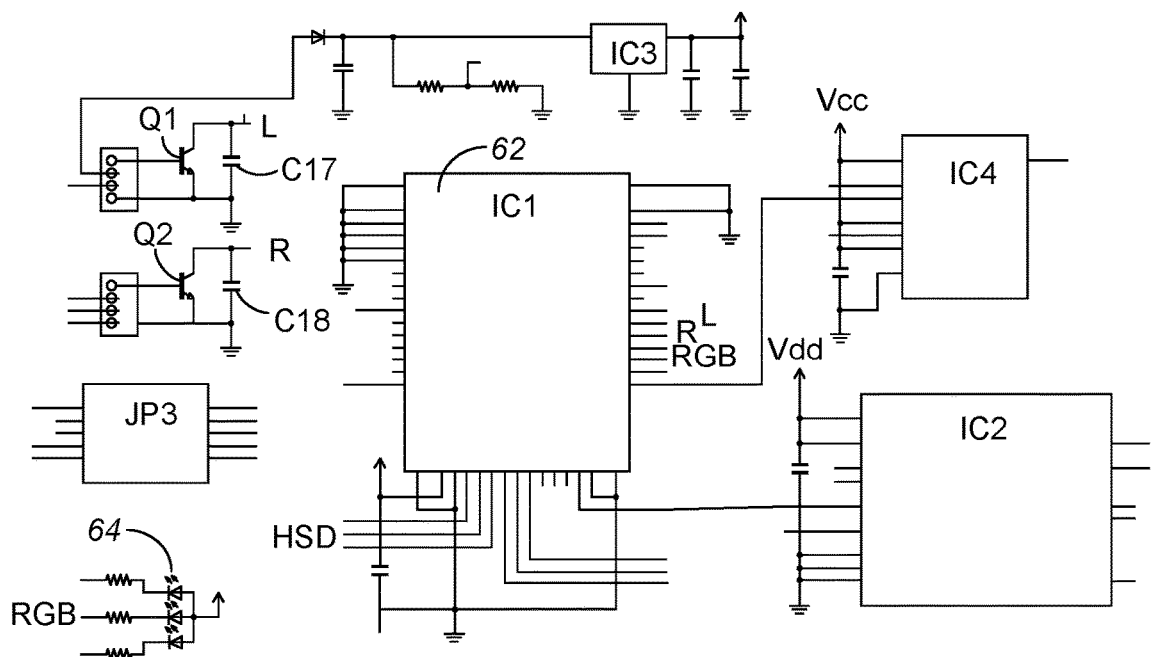
FIG. 9 is a schematic view of the integrated circuit circuit board of FIG. 6.
Figure 16:
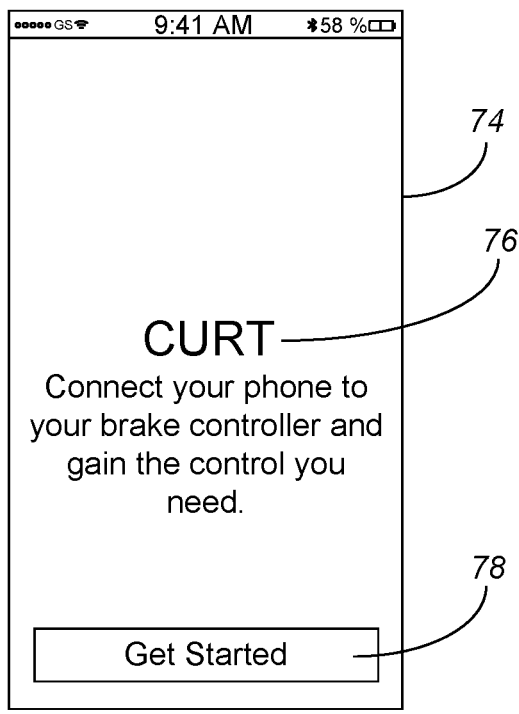
FIGS. 16-23 are screen shot views of the preferred graphical user interface on a smartphone running the preferred application software for interfacing with the brake controller of the present invention.

The primary components on the IC circuit board 40 are detailed in FIGS. 8 and 9. A combined primary microprocessor and wireless radio are provided via IC1, such as Bluetooth Low Energy model no. 4.5 Nordic NRF52832 commercially available from Rigado, Inc. as a combination package BMD-301-A-R. Depending on the integrated antenna of the Bluetooth module IC1, the potting material and geometry and the desired control locations/distance from the smartphone being used, there may be insufficient wireless signal strength, such as for communicating with the IC circuit board 40 using a smartphone located in the cab of the vehicle 12. Accordingly, for improved wireless range and strength, an external antenna 61 may be used such as a model no FXP73.07.0100A commercially available from Toaglas, which can plug into the IC circuit board 40 such as with a U.FL radio frequency coaxial connector. As shown in FIG. 3, the antenna 61 preferably extends outside the potted electronics module 36 but is positioned within the housing 20, allowing connection with common Bluetooth smart phones in the vehicle cab in worst case conditions An accelerometer is provided as IC2, such as a model no. ADXL345BCCZ-RL7 3-axis accelerometer available from Analog Devices. The 3-Axis Accelerometer provides accurate proportional braking output. A linear regulator is provided as IC3, such as a model no. UA78M33IKVURG3 commercially available from Texas Instruments. An EEPROM, for storing the instructions primarily running IC1, is provided as IC4, such as at 128 kB, 10 MHz EEPROM model no. CAT25128VI-GT3 commercially available from On Semiconductors. The left and right turn signals are conditioned with conditioning circuits which include a pre-biased transistor Q1, Q2 such as MMUN2211LT3G commercially available from On Semiconductors and filter capacitor C17, C18 such as UMK105B7103KVHF commercially available from Taiyo Yuden.

As detailed in FIGS. 6-9 and depicted in FIGS. 2-4, there are preferably no input buttons on the housing 20 for communicating or providing instructions to the brake controller microprocessor IC1. Instead, in addition to the typical main circuit board of the prior art brake controllers, the package includes a wireless communication radio 62. To fit the electronics within the housing 20, the electronics may be split between a primary circuit board 38 and a supplementary circuit board 40. In the embodiment shown in FIG. 4, the wireless communication components 62 are mounted on the supplementary circuit board 40. For instance, in the embodiment of FIG. 4, the communication circuit board 40 includes a BLUETOOTH chipset such as the FCC-pre-certified BMD-301-A-R Class 1 BLUETOOTH chipset provided by Rigado Inc. Alternatively, the wireless radio may be a different BLUETOOTH chipset or may use a different wireless protocol entirely, such as a Wi-Fi (IEEE 802.11) radio, a near-field communication radio, a ZIGBEE radio, or even a cellular network radio (all preferably FCC pre-certified). In all these instances, the important consideration is that the brake controller 10 can have its electronic braking parameters (such as aggressiveness, load range, maximum output power, sensitivity and/or any calibration) in its microprocessor IC1 set using a software application on a wirelessly connected computing device or smartphone. The wireless interface preferably also allows manual activation of the trailer brakes.

In some embodiments, there is no output communication device (other than the 7-way plug). The embodiments detailed in FIGS. 2-9 include a minimal output device, such as one or more output light emitting diodes (LEDs) 64. The embodiment shown in FIG. 4 includes three separate LEDs 64, whereas the potted embodiment shown in FIGS. 3 and 5-9 includes a single Red-Green-Blue LED 64, such as a model ASMB-MTB1-0A3A2 RGB LED commercially available from Broadcom. For example, LEDs 64 can be used to indicate one or more of whether the brake controller 10 is receiving power, whether the brake controller 10 is wirelessly communicating with the user's smartphone or other computing device, and whether the brake controller 10 has detected a trailer load. Regardless of whether LEDs 64 are present or absent, the important consideration is that the entire package, including the microprocessor IC1, the wireless communication radio 62, the communication output LEDs 64 and all wiring 42, must be entirely weatherproof. Thus, the embodiment shown in FIG. 4 depicts a primary circuit board 38 (including a microprocessor IC1 and a 3-axis accelerometer IC2), a communication circuit board 40 (including a wireless radio 62), and all wiring connections 42 from the input plug 30 to the output plug 24 being interior to the sealed housing 20, and the embodiment shown in FIGS. 3 and 5-9 having the circuit boards 38, 40 further potted.

FIGS. 10-15 show the preferred method of assembly/potting. As shown by comparing FIGS. 10 and 11, the upper circuit board 40 contains the microcontroller/Bluetooth integrated circuit IC1, the accelerometer IC2, the voltage regulator IC3, etc. is electrically connected to the lower circuit board 38 containing the output high side drivers IC6, IC7 and wire interconnects, with the backs of the printed circuit boards 38, 40 facing each other. The electrical connection can be with plugs JP1 and JP2 and/or with soldering. As shown by comparing FIGS. 11 and 12, a light pipe 66 is adhered or otherwise positioned over the LED 64 on the circuit board 40 such as with room temperature vulcanization silicone rubber.

A bracket 68, depicted in FIG. 13 is installed onto the bottom board 38 as shown in FIG. 14. The bracket 68 holds the assembly 38, 40 in place during the potting process. The wires 42 are connected to the circuit boards 38, 40 such as by soldering as shown in FIG. 14 (only a portion of wires 42 shown in FIGS. 14 and 15). The external antenna 61, if used, is plugged into the wireless radio 62. In the preferred method, this assembly is then potted to encase and protect the various electronic components and fragile electrical connections, such as using a settable polymer. The preferred potting material is a polyurethane resin, such as UR5604 commercially available from Electrolube, which is a two part, high performance, general purpose polyurethane potting and encapsulation resin, which maintains good flexibility, even at low temperatures, while its low viscosity once mixed makes the potting process quick and efficient. By potting the electronic components of the brake controller 10, the electronic components are protected from the harsh and challenging environment the brake controller 10 will be subjected to, including; moisture, vibration, thermal or physical shock and general contamination. When potted as shown in FIG. 15, the wires 42 stick out one side, the external antenna 61 sticks out the other side, and the LED light pipe 66 sticks out the top of the potted electronics module 36. By encapsulating the entire electronics module 36, resins can form a complete barrier against such environments offering superior performance under extreme conditions. As shown in FIGS. 2 and 3, the bottom portion 32 of the housing 20 is joined to the top portion 30 after the electric components have been potted into the potted electronics module 36 and the wires 42 have been run between the input plug 30 and the output plug 24.

The preferred accelerometer-based brake controller 10 uses the 7-way right and left signals on wires 54, 56 as the "stop" indication. In the preferred embodiment, the accelerometer IC2 is only polled/read when the brake signal 58 (if one is present from the towing vehicle, and in an alternative embodiment where the brake signal in the input plug 30 is fed to the electronics module) or both brake light signals 54, 56 are "on" in the 7-way connection. While the accelerometer IC2 is subject to more road vibration when mounted into the standard rear-bumper location than when mounted in the cab of the vehicle as with prior art brake controllers, the fact that the accelerometer IC2 is only polled/read when the brake signal is "on" minimizes the effects of vibration toward false readings of slowing of the towing vehicle 12. While the preferred embodiment has been tested to work in a 7-way connection without further mounting, if desired a mounting flange (not shown) or stabilizing strap (not shown) can be added to better secure the housing to the towing vehicle.

With the brake controller 10 mounted near the rear bumper 18 or on the trailer at the 7-way connector, the invention can in some respects function as an electrical version of the hydraulic "surge brake". U.S. Pat. Nos. 9,707,946, 7,806,240, 7,143,874, 6,848,546, 5,551,539, 5,415,424, 5,390,768 and 4,889,212 are all incorporated by reference for their teachings regarding surge brakes to the extent they can be used consistent with the present invention.

Use of the right and left signal 54, 56 interpretation allows the possibility of brake pulsing when the hazard lights are flashing. Accordingly, the microprocessor IC1 should be programmed to detect and buffer the periodic pulses of the hazard lamp signals in such a way that the trailer brakes are not inadvertently activated once the period pulse is detected, but a non-periodic pulse (such as a brake pedal press or manual pumping of the towing vehicle brakes) still activates the trailer brakes.

Some preferred embodiments allow pulse width modulated ("PWM") signals from the towing vehicle system, similar to the brake light adapter circuit shown in U.S. Pat. No. 8,258,703, incorporated by reference. Regardless of whether the right and left signals 54, 56 of the towing vehicle 12 are PWM or not, if the turn and stop signals are combined on the same pins from the towing vehicle 10 to the input plug 30, the microcontroller IC1 should analyze the turn signal and stop signal combination properly to correctly identify if the towing vehicle 10 is braking while the turn signal is activated.

Further waterproofing may be provided such as with seal/vibration damper 70, formed of softer and water-sealing material such as silicone rubber or other soft thermoplastics, on the outside of the portion plugged into the towing vehicle 12. One preferred material for the seal/vibration dampener 70 is a polyester based thermoplastic polyurethane formed by injection molding, having key features of being phthalate-free, abrasion resistant, excellent surface definition, and good low temperature performance and durability. A similar seal/vibration damper (not shown) may be positioned on the inside of the output plug 24, behind the door 22.

As can be seen, one of the most beneficial aspects is that the brake controller 10 of the present invention is portable, with no or minimal installation, merely in a plug-and-tow strategy. In particular, installation does not require any drilling.

Given the above teachings regarding the structure of the 7-way version, installation and use of the present invention is simple and straightforward. The user plugs the brake controller 10 into the 7-way socket at the back of their towing vehicle 12 and connects in the 7-way plug from his or her trailer.

The present invention uses a smartphone application with wireless connectivity to the brake controller 10 to set aggressiveness, sensitivity, and/or trailer weight and/or present status notifications. The smartphone application can also provide status alerts. For instance, the circuit can sense reverse polarity, over current and short circuit protection, providing a status notification via a status identifier 72 if reverse polarity is sensed of if a short circuit is sensed. As another example, the smartphone application can issue an alert if there is a wireless connection issue. As additional examples, the smartphone application can issue an alert if the towing vehicle battery voltage on the "hot" wire 46 becomes low, or if either of the plugs 24, 30 partially or fully disconnects. As another alternative embodiment, the brake controller 10 can include a lamp out system that allows a user to check the status of the lamps on the trailer upon connecting their trailer, without having to leave the cab of the towing vehicle.

The user pairs their smart phone with the brake controller 10, with several preferred screen shots of the smart phone shown in FIGS. 16-23. In the preferred embodiment, an introduction screen 74 lists a trademark 76 of the brake controller manufacturer. A wireless connection between the phone and the brake controller 10 is made, such as through the settings on the smart phone making a BLUETOOTH connection. A Get Started button 78 then leads to user to a series of configuration screens shown in FIGS. 17-23. If desired, the software application may require entry of a password or PIN to allow the user to access any of the configuration screens.

In some embodiments, in addition to or as an alternative from a password or PIN system, the brake controller 10 includes an anti-theft feature requiring registration of the serial number of the brake controller through the smartphone application, linking the particular brake controller to the particular smartphone. With this anti-theft feature, if the brake controller is stolen, the thief cannot modify the settings of the brake controller without registering his or her smartphone. Because thieves will be loath to register their smartphone as being associated with a particular stolen product serial number, the brake controller has significantly diminished utility to would-be thieves.

Figure 17:
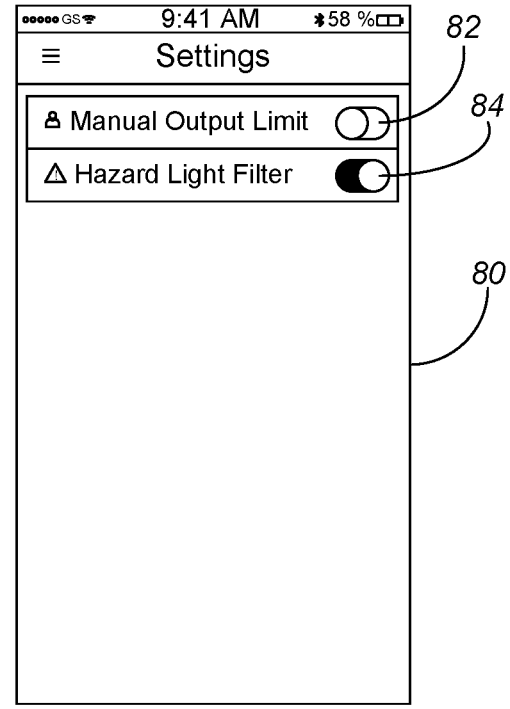

In a Settings screen 80 of FIG. 17, the Manual Output Limit of the brake controller 10 can be turned on or off with a slider button 82, and the Hazard Light Filter described above can be turned on or off with a slider button 84. If the Hazard Light Filter feature is on and the driver activates hazard flashers (which flash the left and right outputs), the brake controller 10 will filter out the signal to prevent brake pulsing.

Figure 18:
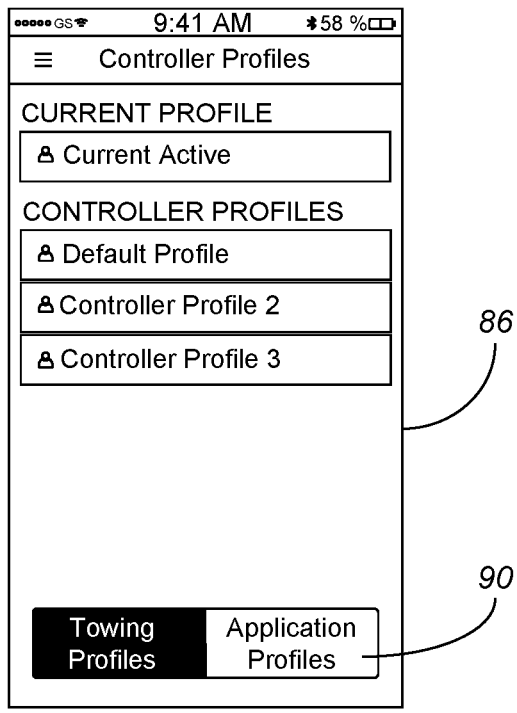
Figure 19:
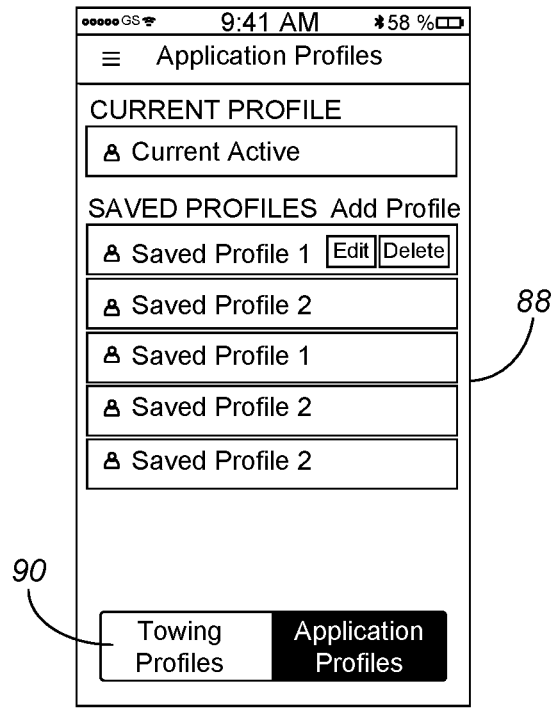

FIGS. 18 and 19 show a screen 86 for selecting the controller profile and a screen 88 for selecting the Application profile, with the user being able to toggle between the two screens of FIGS. 18 and 19 using the selection button 90. The selection button 90 highlights whether the Controller Profile or the Application Profile is displayed. The software application has the ability to store multiple profiles for different towing vehicles and trailers and/or the same trailer with different loads (e.g. empty vs full).

Figure 20:
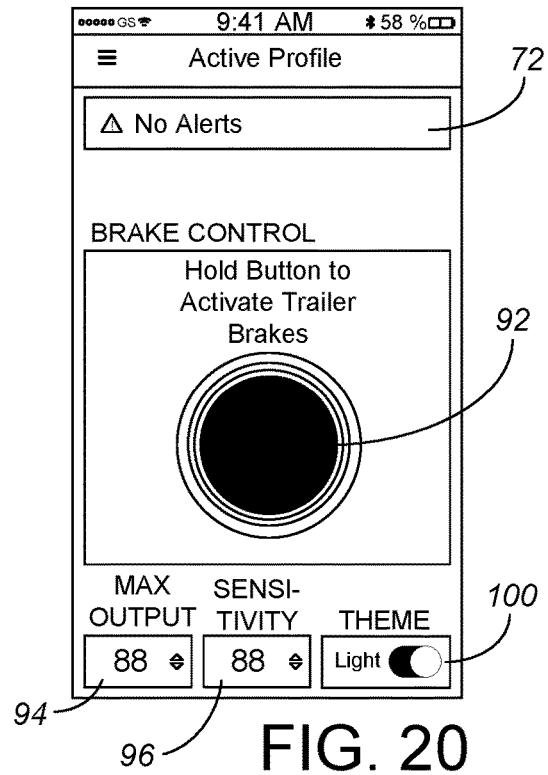
Figure 21:
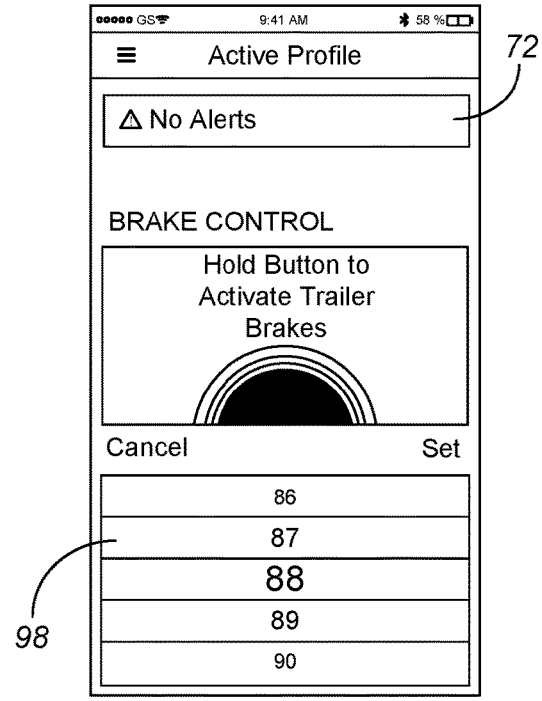

FIGS. 20 and 21 show setting of Brake Control levels. In FIG. 20, a manual control button 92 is in the middle of the screen. The user can press the manual button 92 to manually operate the brakes with a time ramp application. The bottom of the screen show the current setting for the Maximum output 94 and the current setting for aggressiveness or sensitivity level 96 of the brake controller 10. If the user presses either of these buttons 94, 96, a scroll wheel 98 appears that enables the user to change the values for these brake parameters. A theme button 100 merely controls the GUI display color profile. Once the user inputs the settings of FIGS. 17-21, the input settings are saved into the EEPROM IC4 of the brake controller 10 itself until changed.

Figure 22:
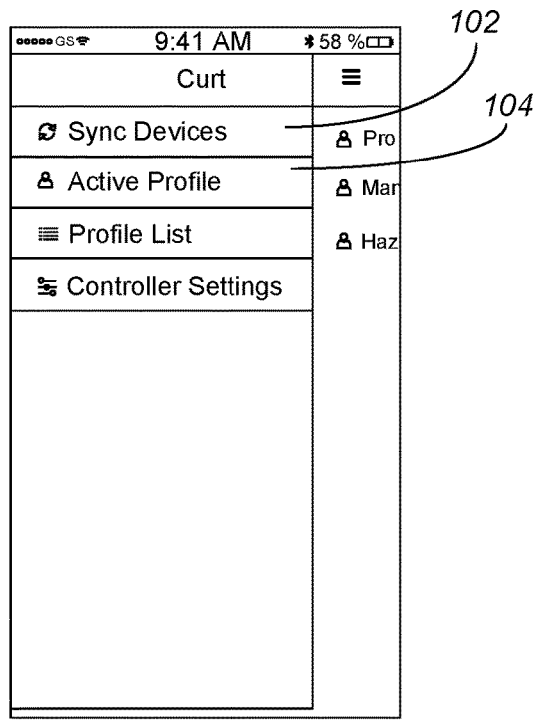
Figure 23:
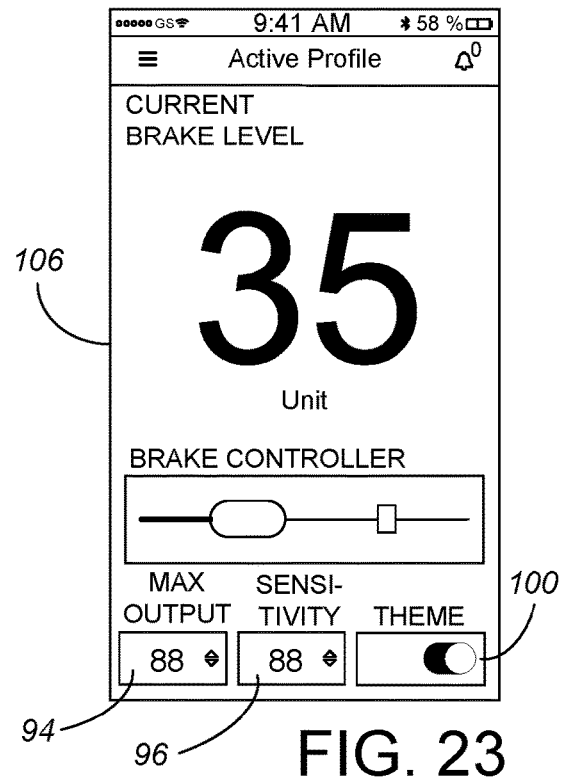

If the user swipes to the right, various buttons appear for other functions of the brake controller 10 and smartphone application as shown in the navigation screen of FIG. 22. In the preferred embodiment, this includes a button 102 to sync the memory of various features between different smartphones. If the user clicks on the active profile button 104, the screen 106 shown in FIG. 23 appears. This screen 106 shows the brake level 108 at any moment in time as the brake controller 10 operates, which is a combination of the various settings and the accelerometer sensed values when appropriate signals are on wires 54, 56, 58.

The preferred embodiment also includes an additional feature, with the microcontroller IC1 automatically reverting to a "safe mode" in the event of a wireless communication loss, such as might happen if the user's smartphone loses battery power or is walked out of range. In general, if wireless communication is lost during resetting of any braking parameters, the brake controller 10 will operate at the last settings (or default factory settings), and the user would no longer be able to change settings or view indications until wireless communication is reestablished. If communication between the smart phone application and brake controller 10 is lost in the middle of a manual brake activation, then after a set period of time (in the preferred embodiment, after two seconds) the brake controller 10 will automatically release the brakes as a safety precaution.

The LED(s) 64 (if present) on the brake controller 10 indicate that the brake controller 10 is powered, that a trailer is detected, and that the wireless signal is connected.

After the settings are input into the brake controller 10, the user drives the vehicle 12 normally while pulling the trailer. When the end user presses the brakes, the left and right outputs 54, 56 of the vehicle 7-way activate and the brake controller 10 sees this as a stop signal. From that point the brake controller 10 functions similar to the existing brake controllers and outputs power to the trailer brakes proportionally based on the output from the accelerometer IC2.

The present invention can be similarly applied to a 4-flat concept, in which the overall functionality is the same as the 7-way except that it is designed to be used with a vehicle equipped with a 4-flat instead of a 7-way. In this concept the brake controller consists of a box with a 4-flat input from the towing vehicle, a 7-way socket to connect to the trailer, the brake control module itself, and a trailer mounted battery (or batteries) which powers the brakes. Since the braking power is proportional to deceleration as sensed by the accelerometer IC2, the brake controller and trailer brakes only consume significant amounts of power when coming to a stop but not when at a stop. Accordingly, the trailer mounted battery can be charged from the 4-flat lighting circuits (primarily the running light output 52, but also optionally the signal light outputs 54, 56), over a long period of time, only expending power during braking. As long as the average charging current is sufficient to store more power than the than the power consumed during braking, the 4-flat brake controller will function as intended, without requiring separate wiring of an electrical power source for the trailer brakes.

As an additional feature of the 4-flat embodiment, the brake controller can include a rechargeable battery, which is used to power trailer brakes. The rechargeable battery is charged from the lighting circuits of the 4-flat while the vehicle is not braking.

Use of the 4-flat version is very similar to the 7-way version. The user plugs the brake controller into the 4-flat at the back of his or her towing vehicle, and connects in the 7-way plug from the trailer. The user pairs a cell phone with the brake controller to set the aggressiveness and sensitivity of the brake controller. The LEDs 64 (if present) on the brake controller indicate that the brake controller is powered, that a trailer is detected, and that the wireless signal is connected. Once the user inputs the settings, they are saved into the brake controller itself until changed.

For all these embodiment, the brake controller 10 can send notifications 72 to the cell phone application in the event of short circuits, load disconnect, battery status, etc.

One potential add-on option is a separate Bluetooth/user interface module (not shown) to be plugged into the power port inside the vehicle cabin. This user interface module could have the following features: manual override (similar to existing brake controllers); power, trailer detection, and wireless connectivity indicators, and sensitivity/aggressiveness settings. The Bluetooth/user interface module thus eliminates the need for the user to have a correctly programmed and powered cell phone.

Separately, wired inputs, including those with a power pin (such as for instance, a USB connection) may be included in addition to or in substitution for the wireless radio 62. In such embodiments, braking parameters such as aggressiveness and trailer weight can be set either with the wireless interface or the wired connection.

The present invention provides numerous benefits over the prior art. The brake controller 10 is portable with simple installation, meant to fit between the existing towing vehicle socket and the trailer plug. Because no display is required, the brake controller 10 is less expensive to manufacture than prior art brake controllers. The smartphone application allows easier control and greater flexibility than the controls on prior art brake controllers. The vibration protection provided by seal/vibration dampener 70 is particularly beneficial so the electronics can avoid being damaged by the vibration at that out-of-cab location on the vehicle 12.

Although the present invention has been described with reference to preferred embodiments, workers skilled in the art will recognize that changes may be made in form and detail without departing from the spirit and scope of the invention.

What is claimed is:

1. A method of installing a brake controller, comprising: plugging an input plug of a brake controller into a plug of a towing vehicle, the brake controller having electronics sealed within a rigid housing, the electronics comprising a microprocessor for determining a towed vehicle brake output, the plugging act causing the brake controller including the housing, the electronics and the microprocessor to have the brake controller's position established by the plug of the towing vehicle and the brake controller to only be supported by the towing vehicle; and plugging a towed vehicle electrical plug into an output plug of the brake controller so the towed vehicle receives the towed vehicle brake output, with the brake controller being boated between the towing vehicle and the towed vehicle.

2. The method of claim 1, wherein the electronics are powered from the towing vehicle, and the input plug electrically connects a hot wire and a common/ground wire of the towing vehicle to the brake controller electronics.

3. The method of claim 1, wherein the housing defines a longitudinal direction of the brake controller from the towing vehicle to the towed vehicle, with the housing rigidly determining the position of the input plug with respect to the output plug with the input plug facing longitudinally in one direction and the output plug facing longitudinally in an opposite direction.

4. The method of claim 1, wherein the input plug and the output plug correspond to each other as plug and socket, so the towed vehicle electrical plug, if not plugged into the output plug of the brake controller, could be plugged directly into the towing vehicle.

5. The method of claim 1, wherein the electronics comprise a wireless radio, and wherein the housing provides no input controls.

6. The method of claim 1, wherein the electronics comprise a sensor to determine deceleration of the towing vehicle.

7. The method of claim 1, wherein microprocessor is able to receive a combined turn and stop signal, and analyzes the turn signal and stop signal combination properly to correctly identify if the towing vehicle is braking while the turn signal is activated.

8. A brake controller for controlling brakes of a towed vehicle based on inputs from a towing vehicle, the brake controller comprising: a rigid housing; a microprocessor within the housing, the microprocessor providing a towed vehicle brake output based in part on inputs from the towing vehicle and based in part on brake controller settings; a wireless radio within the housing and in electrical communication with the microprocessor, the wireless radio being able to wirelessly receive brake controller settings from a smartphone external to the housing; an input plug for receiving input signals from the towing vehicle; and an output plug providing at least the towed vehicle brake output, wherein the housing rigidly determines the position of the input plug with respect to the output plug, wherein the input plug faces an opposite direction as the output plug faces and the brake controller to only be supported by the towing vehicle.

9. The brake controller of claim 8, wherein the microprocessor and the wireless radio are jointly potted within the brake controller housing.

10. The brake controller of claim 9, wherein an antenna for the wireless radio extends outside the potting and within the housing.

11. The brake controller of claim 8, wherein the microprocessor includes non-volatile memory which stores a serial number of the brake controller, which serial number can be paired with identifying information of a computing device during registration of the brake controller using the computing device.

12. The brake controller of claim 8, coupled with a smartphone software application which stores profile settings of the brake controller for different towed vehicles or different towed vehicle weights, which stored profile settings can be wirelessly input into the brake controller.

13. The brake controller of claim 8, coupled with a smart phone software application, wherein the brake controller is able to wirelessly provide one or more alerts to the software application.

14. The brake controller of claim 8, wherein the brake controller further comprises one or more LEDs visible outside the housing, with the LEDs being able to indicate one or more of whether the brake controller is powered, whether a trailer is detected, and whether a wireless signal is connected.

15. A brake controller of claim 8, for controlling brakes of a towed vehicle based on inputs from a towing vehicle, the brake controller comprising: a rigid housing; a microprocessor within the housing, the microprocessor providing a towed vehicle brake output based in part on inputs from the towing vehicle and based in part on brake controller settings; and a wireless radio within the housing and in electrical communication with the microprocessor, the wireless radio being able to wirelessly receive brake controller settings from a smartphone external to the housing; wherein the brake controller can wirelessly receive a manual brake activation signal, and wherein, if the brake controller senses a loss of wireless communication during manual brake activation, then after a set period of time the brake controller will automatically release the brakes as a safety precaution.

* * * * *

UNITED STATES PATENT AND TRADEMARK OFFICE
CERTIFICATE OF CORRECTION

| | |
|---|---|
| PATENT NO. | : 11,390,256 B2 |
| APPLICATION NO. | : 16/163235 |
| DATED | : July 19, 2022 |
| INVENTOR(S) | : Robert Lange, III et al. |

It is certified that error appears in the above-identified patent and that said Letters Patent is hereby corrected as shown below:

In the Claims

In Claim 1, at Column 10, Line 36, delete "boated" and insert therefor --located--.

In Claim 15, at Column 12, Line 13, delete "of claim 8,".

Signed and Sealed this
Thirty-first Day of January, 2023

Katherine Kelly Vidal
*Director of the United States Patent and Trademark Office*